United States Patent [19]

White et al.

[11] Patent Number: 4,534,680
[45] Date of Patent: Aug. 13, 1985

[54] COMBINATION EXPANSION SHELL AND RESIN SECURED MINE ROOF ANCHOR ASSEMBLY

[75] Inventors: Claude C. White, Birmingham; Frederick Carr, Tuscaloosa, both of Ala.

[73] Assignees: Birmingham Bolt Company; Jim Walter Resources, Inc., both of Birmingham, Ala.

[21] Appl. No.: 667,140

[22] Filed: Nov. 1, 1984

Related U.S. Application Data

[62] Division of Ser. No. 349,006, Feb. 16, 1982, Pat. No. 4,483,645.

[51] Int. Cl.$^3$ ............................................. E21D 20/02
[52] U.S. Cl. ...................................... 405/261; 411/47
[58] Field of Search ....................... 405/259, 260, 261; 411/45, 47, 57, 63, 67

[56] References Cited

U.S. PATENT DOCUMENTS

| | | | |
|---|---|---|---|
| 2,952,129 | 9/1960 | Dempsey | 405/261 |
| 3,188,815 | 6/1965 | Schuermann et al. | 405/261 |
| 3,528,253 | 9/1970 | Kovacs | 405/259 X |
| 4,162,133 | 7/1979 | Clark et al. | 405/259 |
| 4,299,515 | 11/1981 | Yates et al. | 405/259 |

*Primary Examiner*—David H. Corbin
*Attorney, Agent, or Firm*—Shlesinger, Arkwright, Garvey & Fado

[57] ABSTRACT

A combination expansion shell and resin secured anchor assembly for installation in a mine roof opening including an elongated bolt having rebar attached to the upper end thereof and an expansion shell below the rebar. The assembly is inserted into a mine roof opening in the back end of which is positioned a resin and catalyst cartridge, the cartridge being ruptured by the rebar, allowing the resin and catalyst to gravitate downwardly between the opening wall and rebar, where they are mixed upon rotation of the bolt and rebar. The bolt is rotated a predetermined number of revolutions to obtain optimum mixing of the resin and catalyst, after which continued rotation of the bolt in the same direction causes outward movement of the expansion shell into gripping engagement with the mine roof.

7 Claims, 12 Drawing Figures

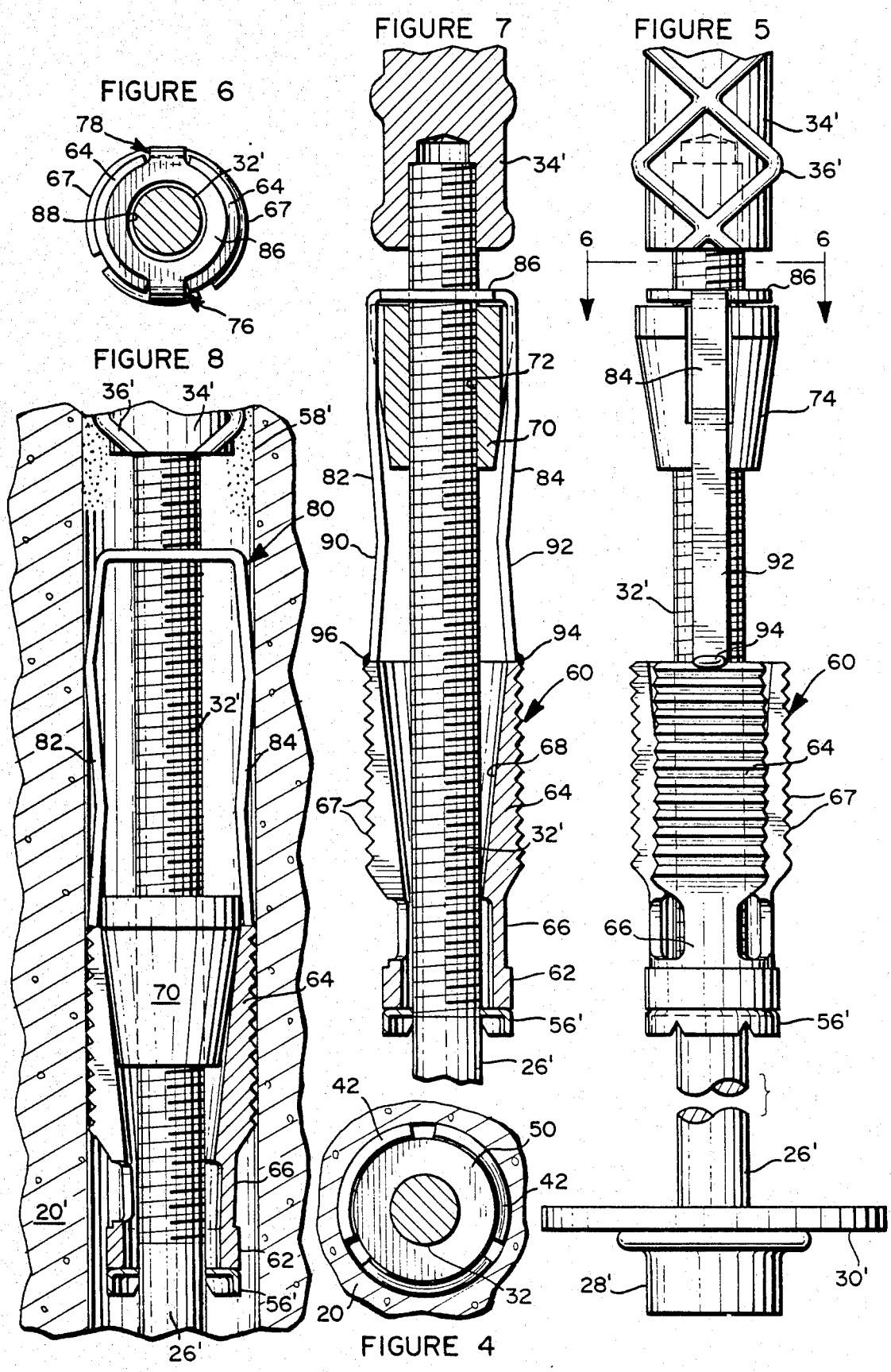

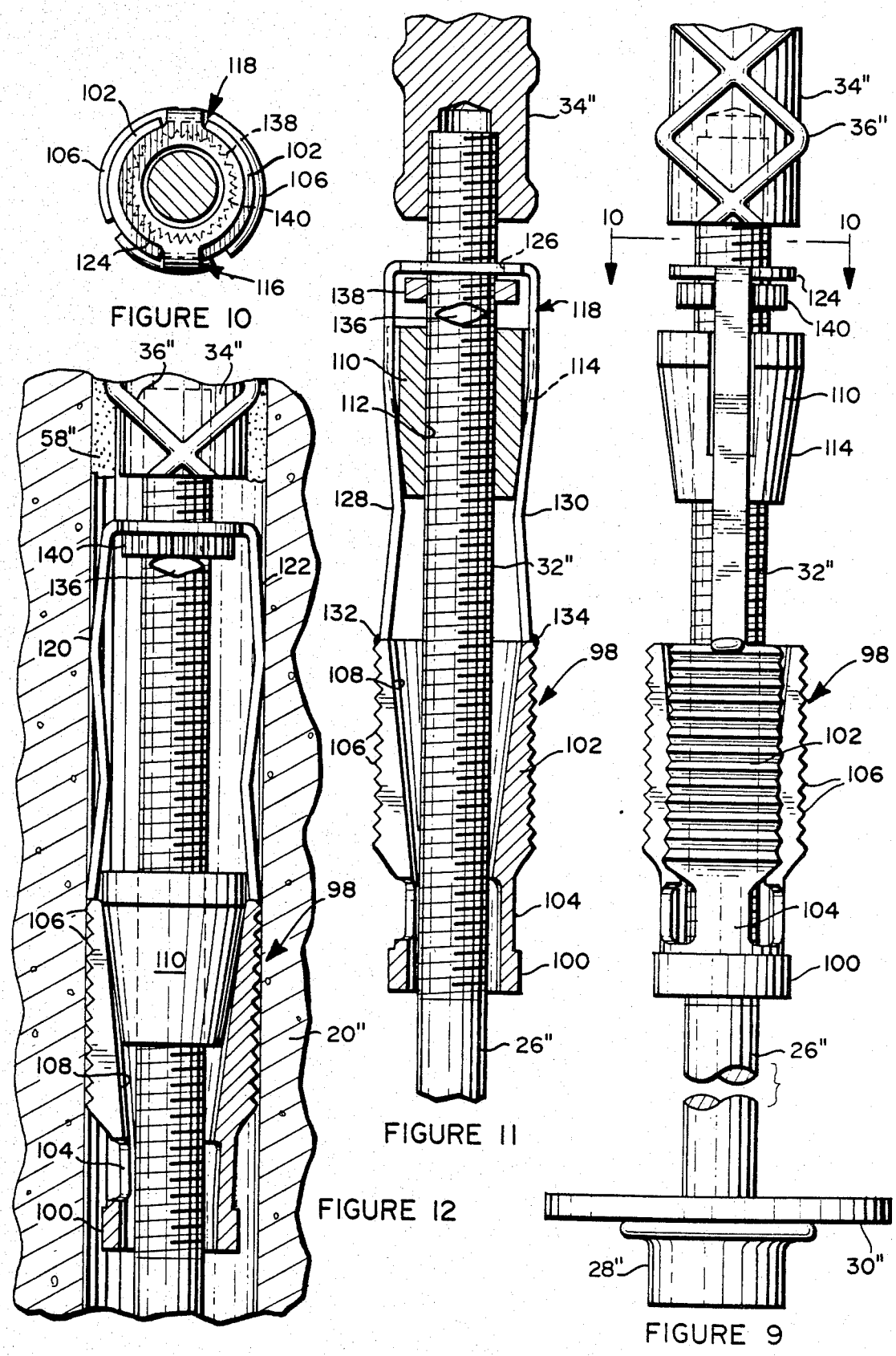

COMBINATION EXPANSION SHELL AND RESIN SECURED MINE ROOF ANCHOR ASSEMBLY

This application is a division, of application Ser. No. 349,006, filed Feb. 16, 1982, now U.S. Pat. No. 4,483,645

BACKGROUND OF THE INVENTION

This invention relates to the securing of anchor bolts in drilled openings in a mine roof for supporting the roof.

Mine roof bolts of the expansion shell type have been widely used for supporting mine roofs. In more recent years, resin anchors have been employed. In the resin type anchor, a resin and catalyst cartridge is inserted into the back of a mine roof opening, following which an anchor bolt is forced upwardly into the opening, thereby rupturing the cartridge to permit the resin and catalyst to gravitate downwardly between the bolt and the wall of the opening. Upon mixing of the catalyst and resin, the resin sets to secure the bolt in the mine roof. In the use of resin type anchors, difficulty has been experienced in properly mixing the resin and catalyst to produce the greatest securing effect, and preventing either undermixing or overmixing of the resin and catalyst.

Resin has also been employed to reinforce or bond expansion shells in mine roofs as illustrated in U.S. Pat. No. 3,702,060 issued Nov. 7, 1972, U.S. Pat. No. 4,160,614 issued July 10, 1979 and U.S. Pat. No. 4,162,133 issued July 24, 1979. U.S. Pat. Nos. 4,160,614 and 4,162,133 mix the resin and catalyst by rotating the bolt in one direction, and actuate the expansion shell by rotation of the bolt in the opposite direction. Additionally, U.S. Pat. No. 3,188,815 issued June 15, 1965 discloses an anchor bolt assembly wherein a resin and catalyst cartridge is punctured by the tip of the roof bolt, following which the bolt is rotated a predetermined number of times for the purpose of mixing the resin and catalyst, an expansion shell carried by an intermediate portion of the bolt then being urged to its expanded position to grip the mine roof.

It has been found, however, that with all of the above combination anchors, there is great difficulty in securing a proper mixture of the resin and catalyst, with a consequent reduction in the effectiveness of the resin in securing the assembly in the mine roof opening. Also, where a sequence of separate and distinct operations are required to mix the resin and catalyst and then to activate the expansion shell, installation time is necessarily increased along with the danger of improper installation.

SUMMARY OF THE INVENTION

The present invention is a combination expansion shell and resin secured mine roof anchor assembly wherein the resin and catalyst are thoroughly mixed when the roof bolt is rotated and, after proper mixture has occurred, continued rotation of the roof bolt automatically activates the expansion shell into gripping engagement with the roof wall. Securement of the assembly in place is therefore carried out in one continuous operation by rotation of the anchor bolt in one direction only as opposed to a two-stage operation, one for properly mixing the resin and catalyst, and the second for expanding the shell into engagement with the opening wall.

The assembly includes an anchor bolt having a head at one end and a threaded shank at the other end for threaded engagement with rebar which rotates with the bolt. An expansion shell is carried by the elongated bolt subjacent the rebar and, after a predetermined number of revolutions of the bolt and rebar, to effect proper mixing of the resin and catalyst, the expansion shell is urged into securing engagement with the mine roof.

The expansion shell includes shell segments having wall-engaging ribs on the outer surface thereof and a tapered inner surface for sliding engagement with the tapered wall of a cone nut which, in one form of the invention is initially mounted on the threaded shank slightly within the expansion shell and, in other forms thereof in predetermined spaced relation thereto. The present invention further contemplates the provision of nut means threaded on the bolt and engaged with a portion of the expansion shell for permitting a predetermined number of revolutions of the bolt and rebar in order to effect proper mixing of the resin and catalyst, following which the cone nut passes through the expansion shell for expanding the segment thereof into securing engagement with the mine roof.

Therefore, upon insertion of the assembly into the mine roof opening, the capsule is ruptured and, as the resin and catalyst gravitate downwardly in the opening between the rebar periphery and the mine roof, the two components are mixed together and, upon completion of the mixing operation, the mixture is substantially coextensive with the length of the rebar. The securing engagement provided by the resin and the added securement of the expansion shell affords dual securing means for the assembly which extends through a substantial portion of the length of the assembly.

DESCRIPTION OF THE FIGURES OF THE DRAWINGS

FIG. 4 is a sectional view taken along the line 4—4 of FIG. 3 looking in the direction of the arrows;

FIG. 5 is a fragmentary elevational view of a modified form of the mine roof anchor assembly, showing the assembly in the initial position of installation;

FIG. 6 is a sectional view taken along the line 5—5 of FIG. 5, looking in the direction of the arrows;

FIG. 7 is a longitudinal sectional view of the mine roof anchor assembly of FIG. 6;

FIG. 8 is a view similar to FIG. 6, showing the mine roof anchor assembly fully installed;

FIG. 9 is a fragmentary elevational view of a third form of the mine roof anchor assembly of the present invention, showing the assembly in its initial position;

FIG. 10 is a sectional view taken along the line 10—10 of FIG. 9 looking in the direction of the arrows;

FIG. 11 is a fragmentary longitudinal sectional view of the mine roof assembly of FIG. 9, and FIG. 12 is a fragmentary elevational view of the mine roof anchor assembly of FIG. 9, showing the assembly

DESCRIPTION OF FORM OF INVENTION ILLUSTRATED IN FIGS. 1 TO 4

Figure 1:
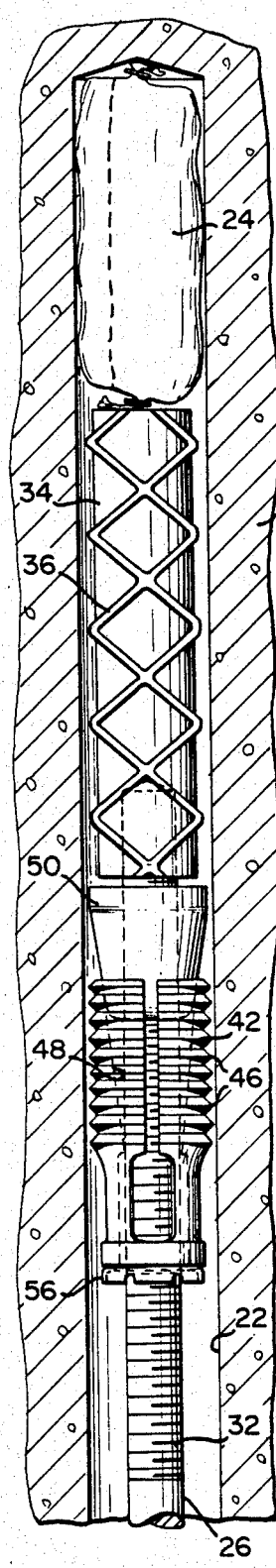
FIG. 1 is a sectional view taken through a mine roof opening showing the initial stage of insertion of one form of the mine roof anchor assembly of the present invention.
Figure 2:
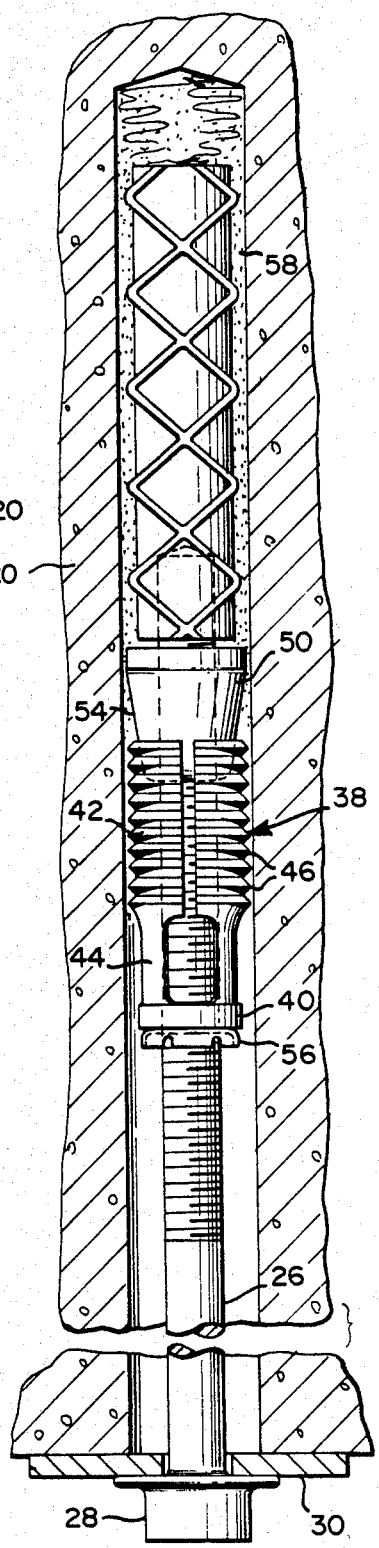
FIG. 2 is a view similar to FIG. 1, showing the second stage of installation of the mine roof anchor assembly of FIG. 1.
Figure 3:
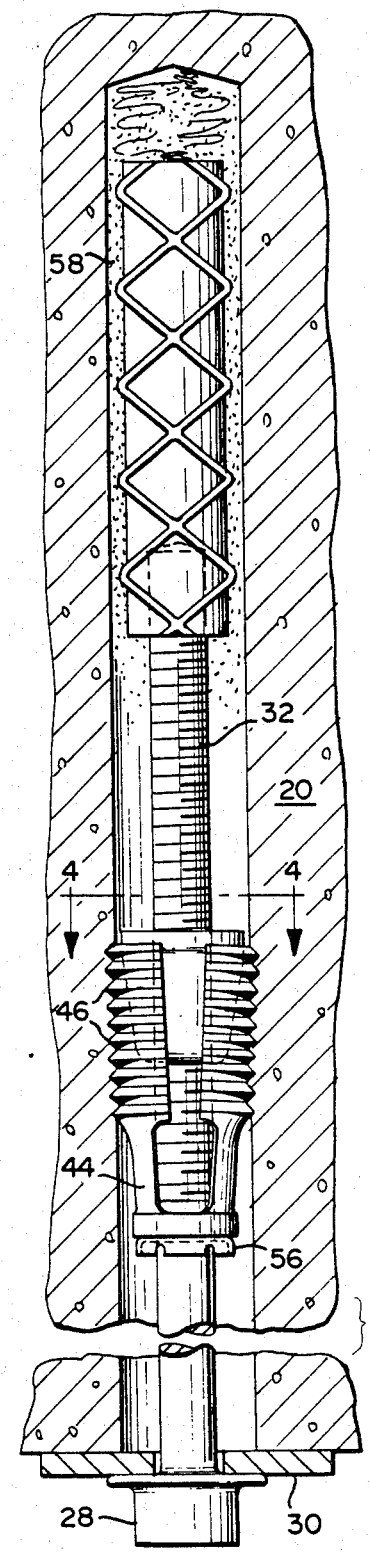
FIG. 3 is a view similar to FIGS. 1 and 2, showing the third stage in the installation of the mine roof anchor assembly.

In FIGS. 1 to 3 there is illustrated a mine roof 20 having an elongated opening 22 therein, in the back end of which is inserted a conventional dual compartment cartridge 24 containing resin and a catalyst. In accordance with the present invention, the mine roof anchor assembly is inserted into the elongated opening for the purpose of providing a combination resin and expansion shell securement of the assembly with the mine roof.

The present assembly includes an elongated bolt 26 having a head 28 at one end thereof which engages a support plate 30 which is interposed between the head and the mine roof as illustrated in FIGS. 2 and 3. At a point intermediate its length, bolt 26 is threaded at 32 to the opposite end thereof, which end is threadedly engaged with rebar 34 which comprises a cylindrical body having double helical ribs 36 extending along the outer periphery thereof. The rebar is preferably of a size to provide an interference fit in elongated opening 22, rebar of 1⅛ inch diameter in a 1⅜ inch diameter hole having been found to operate efficiently in carrying out the objects of the present invention.

The mine roof anchor assembly further includes an expansion shell generally designated 38 which is mounted on bolt 26 subjacent rebar 34.

Expansion shell 38 includes a lower collar or ring 40 which surrounds bolt 26 and a plurality of like, wedge segments 42 which are connected to collar 40 by reduced neck portions 44. Wedge segments 42 are slightly spaced apart and are of arcuate conformation in cross section. The outer surface of each wedge segment is provided with a series of transverse ribs 46 adapted for gripping engagement with the mine roof wall when the expansion shell is actuated. As shown to advantage in FIG. 1, the inner surface of each wedge segment is inwardly tapered from top to bottom as shown as 48.

Expansion shell 38 further includes a cone or wedge nut 50 having an axial threaded bore 52 for threaded engagement with threaded portion 32 of bolt 26. The outer surface of cone nut 50 is tapered inwardly from a point near the top to its bottom thereof, as indicated at 54, for sliding engagement with the tapered wall 48 of wedge segments 42. It will be noted from FIGS. 1 and 2 that in its initial position when inserted into the elongated opening 22, cone nut 50 lies partially within the upper end of expansion shell 38, but is not in expanding engagement therewith.

It is salient feature of the present invention to provide nut means, preferably comprising a palnut 56 which is threadedly engaged with threaded portion 32 of bolt 26 in supporting engagement with expansion shell 38, to hold the latter in the position shown in FIGS. 1 and 2.

It will be further noted from a consideration of FIGS. 1 and 2 that palnut 56 is threadedly engaged with threaded bolt portion 32 at a point which is a predetermined distance from the unthreaded portion of the bolt. The number of revolutions of the bolt required to move palnut 56 downwardly to the unthreaded portion of the bolt corresponds to the number of revolutions required by rebar 34 to effect proper mixing of the resin and catalyst after the resin cartridge has been ruptured. At that time, continued rotation of bolt 26 causes cone nut 50 to move longitudinally of the expansion shell, thereby causing engagement of tapering wall surface 54 of the cone nut with the tapering inner wall surfaces 48 of wedge segments 42 to force the latter outwardly into engagement with the mine roof, as shown to advantage in FIG. 3.

In installation of the mine roof anchor assembly of FIGS. 1 to 4, dual compartment cartridge 24 is first inserted into elongated opening 22, after which the anchor assembly is thrust upwardly into the opening, thereby rupturing the cartridge and permitting the resin and catalyst to gravitate downwardly between the wall of the opening and the outer periphery of rebar 34, the opening being approximately ⅛ to ¼ inch wide. The assembly is rotated mechanically to cause a mixing of the resin and catalyst indicated at 58. During rotation of bolt 26 and rebar 34, the frictional engagement of expansion shell 38 with that portion of the roof 20 defining opening 22, prevents rotation thereof. Also, by virtue of the frictional engagement of the upper surface of palnut 56 with the lower surface of expansion shell 38, palnut 56 also will not rotate but, upon rotation of bolt 26, palnut 56 and expansion shell 38 supported thereby move downwardly along the bolt until palnut 56 reaches the unthreaded portion of bolt 26.

At this time, rebar 34 has rotated the predetermined number of revolutions required to effect proper mixing of the resin and catalyst for obtaining maximum securement of the resin to the rebar and the mine roof. Continued rotation causes cone nut 50 to pass between the wedge segments 42 of expansion shell 38, to effect outward movement of the segments until ribs 46 thereof securely engage the mine roof to provide a combination resin secured and mechanically secured engagement of the anchor assembly with the mine roof which extends through a substantial portion thereof.

DESCRIPTION OF FORM OF INVENTION ILLUSTRATED IN FIGS. 5 TO 8

In FIGS. 5 to 8, there is illustrated a modified form of the combination expansion shell and resin secured anchor assembly of the present invention wherein portions thereof which are similar to the form of invention illustrated in FIGS. 1 to 4, are designated by like, primed numbers. In this form of the invention, the expansion shell is designated 60, and includes a lower collar or ring 62 which surrounds threaded portion 32' of bolt 26', and a plurality of like, wedge segments 64 which are connected to collar 62 by reduced neck portions 66. The wedge segments are slightly spaced apart, and the outer surface thereof is provided with a series of transverse ribs 67 for gripping engagement with the mine roof wall when the expansion shell is actuated. As shown in FIGS. 7 and 8, the inner surface of each wedge segment 64 is inwardly tapered from top to bottom as shown at 68.

Expansion shell 60 further includes a cone nut 70 having an axial threaded bore 72 for threaded engagement with threaded portion 32' of bolt 26'. The outer surface of cone nut 70 is tapered inwardly from a point near the top to its bottom thereof, as indicated at 74, for sliding engagement with the tapered walls 68 of wedge segments 64. Diametrically opposite side edges of cone nut 70 are cut away to provide longitudinal grooves 76 and 78, as shown to advantage in FIG. 6.

In accordance with this form of the invention, there is also provided an inverted U-shape bail member 80 which extends upwardly from wedge segments 64. Bail member 80 is preferably made of relatively rigid material of uniform width and thickness and includes a pair of like, spaced legs 82 and 84, the upper ends of which lie within grooves 76 and 78 of cone nut 70 to insure proper engagement with the latter. The upper end of legs 82 and 84 are joined by a connecting portion which comprises a disk 86 having a central opening 88 through which threaded portion 32' of bolt 26' passes for engagement with rebar 34'.

At a point intermediate their length, legs 82 and 84 of bail member 80 are slightly bent inwardly as indicated at 90 and 92. The lower limits of legs 82 and 84 are welded, or secured in any other suitable manner to diametrically opposed portions of wedge segments 64 as indicated at 94 and 96.

Expansion shell 60 is held in subjacent relation to rebar 34' by a palnut 56' which, in this form of the invention is located at the lowermost extremity of threaded portion 32' of bolt 26' in order to prevent longitudinal movement of the palnut and expansion shell upon rotation of bolt 26'.

It will be noted from a consideration of FIGS. 4 and 5 that, in this form of the invention, cone nut 70 lies in predetermined spaced relation from wedge segments 64 so that, as bolt 26' is rotated, cone nut 70 is threaded downwardly along threaded part 32' until it moves into expanding engagement with tapering walls 68 of wedge segments 64.

The number of revolutions of bolt 26' required to move cone nut 70 from its initial position shown in FIG. 4 to the position where it is in expanding engagement with wedge segments 64, as shown in FIG. 8, corresponds to the number of revolutions of rebar 34' to effect proper mixing of the resin and catalyst 58'.

The procedure for installing the anchor assembly illustrated in FIGS. 5 to 8 is substantially the same as in the installation of the anchor assembly of FIGS. 1 to 4. It is noted, however, that as cone nut 70 moves longitudinally downwardly on threaded portion 32' of the bolt, it passes through a restricted passageway formed by bent portions 90 and 92 of legs 82 and 84. This produces a slight flexing of the bent portions, with resultant slight expansion of the wedge segments, thereby urging the segments into frictional engagement with the opening wall to prevent rotation of the expansion assembly, without urging the segments into gripping engagement with the wall.

The distance between the cone nut and the shell enables bail member 80 to be made with relatively long legs, thereby permitting the use of thicker, more rigid, strap material for making the bail member, while at the same time, permitting the necessary spring action of the legs which will not resist the expanding action of the wedge segments. It has been found that a steel strap of approximately 5/16 inches in width and 3/32 inches to 5/32 inches in thickness obtains the desired results. A thickness of ⅛ inch has been found to produce the best results.

DESCRIPTION OF FORM OF INVENTION ILLUSTRATED IN FIGS. 9 TO 12

In FIGS. 9 to 12, there is illustrated a further modification of the anchor assembly of the present invention wherein portions thereof are similar to those described in connection with the form of invention illustrated in FIGS. 1 to 4. Accordingly, similar parts are identified by like, double primed numbers.

In accordance with this form of the invention, there is provided an expansion shell 98 which includes a lower collar or ring 100 which surrounds threaded bolt part 32', and a plurality of like, wedge segments 102 which are connected to collar 100 by reduced neck portions 104. Wedge segments 102 are slightly spaced apart and are of arcuate conformation in cross section. The outer surface of each wedge segment is provided with a series of transverse ribs 106 adapted for gripping engagement with the mine roof wall when the expansion shell is actuated. As shown to advantage in FIG. 11, the inner surface of each wedge segment 102 is inwardly tapered from top to bottom as shown at 108.

Expansion shell 98 further includes a cone or wedge nut 110 having an axial threaded bore 112 for threaded engagement with threaded bolt 26''. The outer surface of cone nut 110 is tapered inwardly from a point near the top to its bottom thereof, as indicated at 114, for sliding engagement with the tapered walls 108 of wedge segments 102. Diametrically opposite edges of cone nut 110 are cut away to provide longitudinal grooves 114 and 116, as shown to advantage in FIG. 10.

In accordance with this form of the invention, there is provided an inverted U-shape bail member 118 which extends upwardly from wedge segments 102. Bail member 118 is preferably made of relatively rigid material of uniform width and thickness and includes a pair of like, spaced legs 120, 122, the upper ends of which lie within grooves 114 and 116 of cone nut 110 to insure proper engagement with the latter. The upper ends of legs 120 and 122 are joined by a connecting portion comprising a disk 124 which overlies the cone nut. Disk 124 is provided with a central opening 126 in order to permit the passage of threaded part 32'' of the bolt therethrough for engagement with rebar 34''. Just as in the form of invention illustrated in FIGS. 5 to 8, at a point intermediate their length, legs 120 and 122 are bent inwardly at 128 and 130 in order to provide a restricted passageway through which cone nut 110 is adapted to pass. The lower limits of legs 120 and 122 are welded or secured in any other suitable manner to diametrically opposed portions of wedge segments 102, as indicated at 132 and 134. In this form of the invention, threads 32'' are distorted at 136 between the upper extremity of bail member 118 and cone nut 110. A special retaining nut 138 is threadedly engaged with threaded part 32'' of the bolt between disk 124 and distorted threads 136, the outer periphery of which nut is serrated as indicated at 140 for facility in threading the nut on the end of the bolt.

The distorted threads 36 prevent nut 138 from screwing further down threaded part 32'' and supports bail member 118 to prevent the bail member and the expansion shell connected thereto from moving longitudinally of the bolt upon rotation of the latter.

The procedure in installing the assembly in this form of the invention is substantially the same as in connection with the form of invention illustrated in FIGS. 5 to 8.

As the bolt and rebar are rotated, the ribs 106 of the expansion shell engage the mine roof wall to prevent rotation of the expansion shell and the bail member, thereby causing cone nut 110 to be threaded downwardly on threaded part 32'' of the bolt into expanding engagement with the wedge segments of the expansion shell. During this time, the distorted threads 136 cause the special nut to remain stationary. The passage of cone nut 110 through the restricted passageway formed by bent portions 128 and 130 causes a slight flexing of these portions and a resultant slight expansion of the wedge segments towards the latter into frictional engagement with the mine roof wall to positively preclude any rotation of the expansion shell.

As also set out above in connection with the form of invention illustrated in FIGS. 5 to 8, the distance between the cone nut and the wedge segments require a predetermined number of revolutions for the cone nut to effect expansion of the wedge segments into gripping engagement with the mine roof and the number of these revolutions corresponds to the number of revolutions required to effect proper mixing of the resin and catalyst gravitating through the opening between rebar 34" and the mine roof.

In all forms of the present invention, installation is carried out in one continuous operation so that, when sufficient torque developes due to tension in the bolt, the drill rotating the bolt stalls and indicates secure engagement of the shell with the mine roof.

Simultaneously, the bolt and rebar have been rotated a sufficient number of revolutions to effect proper mixture of the resin and catalyst, without undermixing or overmixing the resin and catalyst, approximately 20 revolutions having been found to produce optimum results. The anchor assembly of the present invention affords simple and economic means for combining the gripping forces of an expansion shell anchor and a resin anchor in a single assembly which securely and firmly holds a mine roof bolt in a roof opening, thereby positively minimizing the chances of failure of the anchor assembly after installation.

The present assembly furthermore may be readily installed in the mine roof opening in one continous operation by inserting the assembly in the opening and then rotating the bolt in one direction only. During this operation, the resin and catalyst are automatically mixed to the proper degree, following which the expansion shell is sequentially activated into gripping engagement with the mine roof.

Although there has been herein shown and described the presently preferred forms of this invention, it is to be understood that various changes may be made therein within the scope of the appended claims.

What is claimed is:

1. A mine roof anchor assembly in combination with a dual compartment resin and catalyst cartridge inserted into a mine roof opening, the anchor assembly including
   (a) an elongated bolt having a head at one end and threaded for a portion of its length at the other end
   (b) a mixing and securing member carried by said elongated bolt
   (c) an expansion member carried by said elongated bolt adjacent said mixing and securing member
   (d) the resin and catalyst cartridge being ruptured by said assembly when it is forced upwardly into the mine roof opening, thereby permitting the resin and catalyst to gravitate downwardly between the wall of the opening and said mixing and securing member
   (e) a nut threadedly engaged with said elongated bolt, and in supporting engagement with said expansion member
   (f) stop means for holding said nut in fixed engagement with said elongated bolt, said stop means comprising distorted threads on the threaded portion of the elongated bolt
   (g) said expansion member frictionally engaging the wall of the mine roof opening during rotation of the elongated bolt, and said mixing and securing member, to prevent rotation of the expansion member
   (h) a wedge member threadedly engaged with said elongated bolt for engagement with said expansion member, to urge the latter into gripping engagement with the mine roof, and
   (i) means for preventing rotation of said wedge member
   (j) said wedge member being initially positioned on said elongated bolt in predetermined longitudinally spaced relation to said expansion member whereby, upon rotation of said elongated bolt relative to said expansion member, said wedge member moves longitudinally of said elongated bolt until said wedge member engages said expansion member, and continued rotation causes said wedge member to activate said expansion member into gripping engagement with the mine roof
   (k) the number of revolutions of said elongated bolt required to move said wedge member into engagement with said expansion member corresponding to the number of revolutions required by said mixing and securing member to effect proper mixing of the resin and catalyst after the resin cartridge has been ruptured.

2. The mine roof anchor assembly of claim 1, wherein
   (a) said mixing and securing member is rebar.

3. The mine roof anchor assembly of claim 1, wherein
   (a) said expansion member comprises an expansion shell having wedge segments carried by said elongated bolt
   (b) a bail member including spaced legs, the lower ends of which are connected to diametrically opposed portions of the upper extremities of said wedge segments
   (c) a connecting portion joining the upper ends of said legs
   (d) said connecting portion having an opening through which said elongated bolt passes for engagement with the mixing and securing member.

4. The mine roof anchor assembly of claim 3, wherein
   (a) the wedge segments of said expansion shell includes a plurality of wall-engaging ribs extending outwardly from the outer surface of the wedge segments
   (b) the inner wall of said wedge segments being tapered inwardly from top to bottom
   (c) said wedge member comprising a cone nut, the outer surface of which is tapered inwardly from top to bottom and adapted to engage the tapering inner wall of said wedge segments for expanding said wedge segments into securing engagement with the mine roof wall.

5. The mine roof anchor assembly of claim 3, wherein
   (a) said means for preventing rotation of said wedge member comprises longitudinal grooves on diametrically opposite sides of said wedge member for receiving the spaced legs of said bale member to prevent relative rotation of said wedge member and expansion member.

6. The mine roof anchor assembly of claim 5, wherein
   (a) an intermediate portion of the legs of said bail member are bent inwardly to provide a restricted passageway through which said wedge member passes, for effecting slight expansion of said wedge segments into frictional engagement with the wall.

7. A mine roof anchor assembly in combination with a dual compartment resin and catalyst cartridge inserted into a mine roof opening, the anchor assembly including (a) an elongated bolt having a head at one end and threaded for a portion of its length at the other end (b) rebar engaged with the threaded portion of said elongated bolt, and rotatable therewith for mixing the resin and catalyst (c) an expansion member carried by the threaded portion of said elongated bolt (d) said expansion member including an expansion shell comprising a plurality of wedge segments, the inner surface of each of said segments is inwardly tapered from top to bottom (e) a plurality of wall-engaging ribs extending outwardly from the outer surface of said wedge segments (f) a bail member including spaced legs, the lower ends of which are connected to diametrically opposed portions of the upper extremities of said wedge segments (g) a connecting portion joining the upper ends of said legs (h) said connecting portion having an opening through which said elongated bolt passes for engagement with the rebar (i) a cone nut threadedly engaged with said elongated bolt between the legs of said bail member, the outer surface of said cone nut being tapered inwardly from top to bottom and adapted to engage the tapering inner surfaces of said wedge segments for expanding said wedge segments into securing engagement with the mine roof wall (j) diametrically opposite sides of said cone nut being cut away to provide longitudinal grooves for receiving the spaced legs of said bail member to prevent relative rotation of said cone nut and expansion shell (k) a nut threadedly engaged with the threaded portion of said elongated bolt between the legs of said bail member and in engagement with the connecting portion of said bail member for supporting the expansion member (l) stop means for limiting the longitudinal movement of said nut on the threaded portion of said elongated bolt, said stop means being distorted threads engaged by said nut to prevent longitudinal movement of said expansion member (m) said cone nut being initially positioned on said elongated bolt in predetermined longitudinally spaced relation to said expansion member whereby, upon rotation of said elongated bolt relative to said expansion member, said cone nut moves longitudinally of said elongated bolt until said cone nut engages the wedge segments of said expansion member, and continued rotation causes said cone nut to activate said expansion member into gripping engagement with the mine roof (n) the number of revolutions of said elongated bolt required to move said cone nut into engagement with said expansion member corresponding to the number of revolutions required by rebar, to effect proper mixing of the resin and catalyst after the cartridge has been ruptured.

* * * * *